United States Patent [19]

Grace

[11] Patent Number: 4,849,269
[45] Date of Patent: Jul. 18, 1989

[54] SUBFLOORING COMPOSITE

[75] Inventor: Ronald R. Grace, Hamilton, Ohio

[73] Assignee: Nifty Products, Inc., Hamilton, Ohio

[21] Appl. No.: 219,359

[22] Filed: Jul. 15, 1988

[51] Int. Cl.$^4$ ................................................ B32B 3/00
[52] U.S. Cl. ...................................... 428/81; 428/116; 428/119; 428/166; 428/178; 428/188; 428/213; 428/220; 428/316.6
[58] Field of Search ............... 428/116, 166, 167, 178, 428/188, 80, 81, 119, 120, 213, 220, 316.6

[56] References Cited

U.S. PATENT DOCUMENTS

| | | | |
|---|---|---|---|
| 2,064,132 | 12/1936 | Upson | 428/282 |
| 2,980,575 | 4/1961 | Petry | 428/282 |
| 4,091,149 | 5/1978 | Oxendine | 428/81 |
| 4,170,674 | 10/1979 | Matsuki | 428/90 |
| 4,172,917 | 10/1979 | Angelle et al. | 428/95 |
| 4,569,872 | 2/1986 | Miller | 428/178 |

Primary Examiner—William J. Van Balen
Attorney, Agent, or Firm—Charles R. Wilson

[57] ABSTRACT

A subflooring composite is especially useful in a van. The composite comprises a plastic core having a thin planar bottom surface layer, a thin planar top surface layer and a series of substantially equi-spaced and generally vertically extending support walls connecting the bottom and top surface layers. A foam underlay is adhered to the plastic core's underside. The subflooring composite has good structural strength, insulation properties, and acoustic qualities. It is readily precut to abut against the interior vertical walls of the van.

26 Claims, 2 Drawing Sheets

SUBFLOORING COMPOSITE

Invention relates to a lightweight subflooring composite. More particularly, the invention relates to a subflooring composite useful in the interior floor area of a van.

Vans are originally equipped by the manufacturer with a basic open rear interior area. A significant industry has been created by the desires of van owners to convert their van's interior area into a more liveable or luxurious space. Oftentimes, swivel chairs, cabinets, wet bars, etc are installed.

The van converter will initially strip the van's rear interior area of carpet and any other factory installed component to unveil a substantially flat open area. The floor of the van is normally made of metal with ridges extending length-wise. The surface is made smooth by the installation of furring strips bolted to the floor and/or the installation of a thick plywood or wafer board. A substantial number of cuts must be made in the plywood or wafer board to accommodate the vehicle's irregular interior shape. This subflooring is needed to present a smooth surface not only for comfort purposes, but also for ease of installation of new components such as chairs, etc. Self-tapping screws or bolts and nuts are used to hold the subflooring in place.

The installation of the plywood or wafer board subflooring is difficult due to its weight. The need to cut it in an irregular shape also presents special problems. Still another drawback to the conventionally used subflooring is its stability. It does tend to swell or contract due to humidity and temperature fluctuations. Because the subflooring is normally pieced together from sections, there is a tendency for the subflooring to occasionally break at its seams or pull loose from the van's metal floor. The subflooring is also subject to deterioration due to inadvertent liquid spills or rain water exposure.

There is a need for a subflooring material will can be readily installed in a van without all the disadvantages of that currently used. The subflooring ideally would be lightweight, easily cut or shaped and strong enough to withstand weight forces normally encountered. Of course, the subflooring must also be cost effective and have all the qualities normally expected of such a product, e.g. capable of presenting a smooth upper surface, good insulation properties and good acoustic qualities. In accord with this invention, there has been developed such a product.

SUMMARY OF THE INVENTION

A subflooring composite of at least two layers is especially useful in vans. The composite comprises a core of a plastic material having a thin planar bottom surface layer and a thin planar top surface layer with a series of substantially equi-spaced and generally vertically extending support walls connecting the bottom surface and top surface layers to form a unitary core structure. A foam underlay is adhered to one side of the core and, in a preferred embodiment, a fibrous overlay is adhered to the other side of the core. The subflooring composite can be precut to fit the interior floor space of a van and readily installed as a single piece of goods.

DETAILED DESCRIPTION OF THE INVENTION

Figure 1:
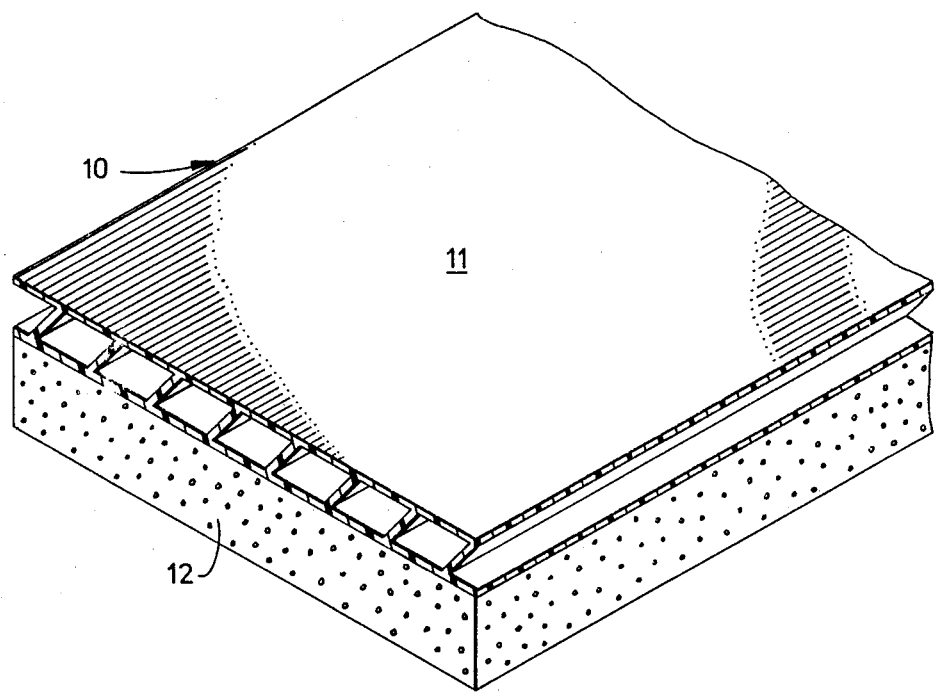
FIG. 1 is a view in perspective of the subflooring composite of this invention.
Figure 2:
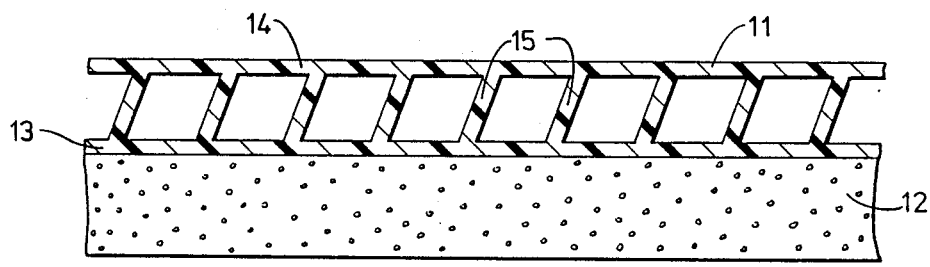
FIG. 2 is a side view of the subflooring composite of FIG. 1.
Figure 3:
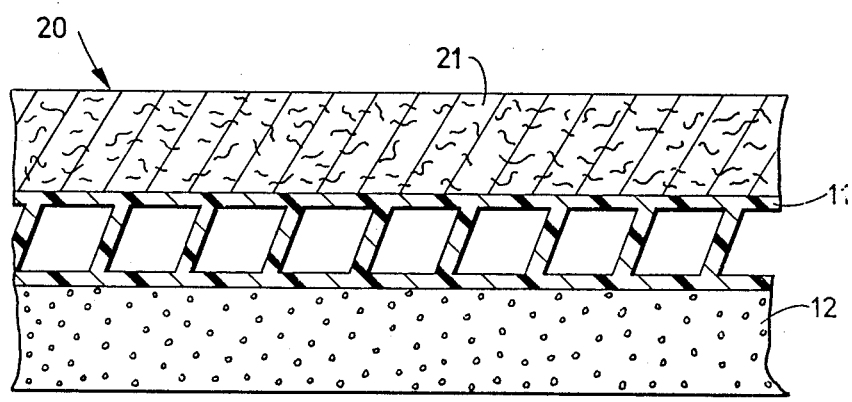
FIG. 3 is a side view of another subflooring composite of the invention.
Figure 4:
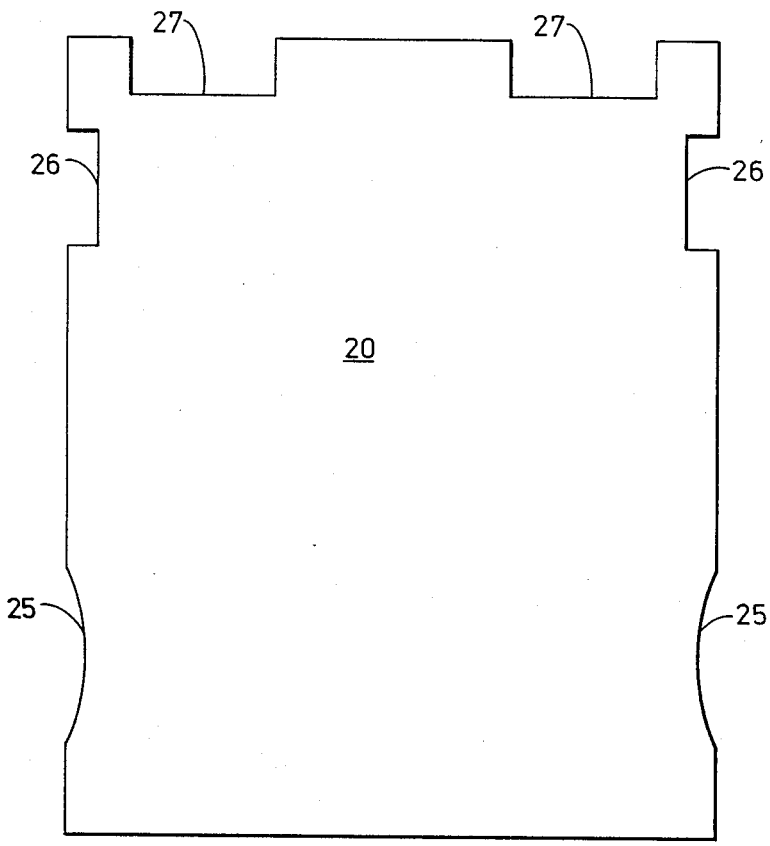
FIG. 4 is a top view of the subflooring composite of FIG. 3 precut to fit the interior floor surface of a van.

The invention is described with particular reference to the drawings. FIGS. 1, 2 and 3 illustrate the materials used in the construction of subflooring composites while FIG. 4 illustrates a subflooring composite which has been precut according to the interior dimensions of a particular van. It is to be understood that recreational vehicles and other motor vehicles having a generally flat interior space can utilize the subflooring of this invention. The description which follows will be with reference to vans, though the other vehicles can as well utilize the subflooring of the invention.

With reference to FIGS. 1 and 2, there is shown a subflooring composite 10 comprised of a plastic core 11 and a foam underlay 12. The core and underlay are adhered together sufficiently to withstand lateral forces as normally experienced in the installation of the subflooring in a van as well as normal use once installed. Preferably, an adhesive is applied to one side of the plastic core and a sheet of foam laminated to it. A contact adhesive is optimumly used, though other adhesives can as well be used.

The plastic core 11 comprises a thin planar bottom surface layer 13 and a thin planar top surface layer 14 which are joined together by support walls 15. The support walls 15 are equi-spaced and extend in a generally vertical direction from the bottom surface layer to the top surface layer. The bottom surface layer, top surface layer and support walls are formed from a plastic material and in effect form a unitary structure. A substantial amount of dead air space occupies the areas between the support walls and contributes to the physical properties of the composite as further discussed in following paragraphs. From three to ten, preferably four to six, support walls per linear inch are used. The support walls extend at an angle of from about thirty-five degrees to about ninety degrees from the horizontal.

Plastic core 11 has a thickness of from about 0.1 inches to about 0.4 inches, preferably from about 0.2 inches to about 0.3 inches. It has sufficient structural strength to withstand vertical forces as normally found in a van without crushing and to withstand lateral forces without wrinkling. Both characteristics are needed because of the use to which the composite subflooring is subjected. Preferably, the plastic core is capable of withstanding at least about 80 pounds per square inch without crushing. Such plastic cores are commercially available in various widths, thicknesses, and strengths. They are made from high impact polypropylene/polyethylene copolymers or other polymeric resins.

The foam underlay 12 provides a cushioning effect and serves as a means to even out ridges normally built into a van's interior floor surface by the manufacturer. Thus, the foam underlay accommodates or absorbs the floor's uneven floor surface without affecting the plastic core's lay or top surface area. Various foams of open-cell and closed-cell nature are commercially available and usable herein. A foam thickness of at least about 0.1 inches is needed to achieve the benefits of the foam while the upper foam thickness is dictated more by cost considerations and feel. Preferably, the foam underlay has a thickness of from about 0.1 inches to about 0.4 inches and a density of from about two pounds per cubic foot to about four pounds per cubic foot. A preferred foam is an open-cell polyurethane foam. Such foams possess the ability to be readily adhered to the plastic core and to the vehicle's metal floor surface.

The composite of the plastic core 11 and foam underlay 12 is produced in widths and lengths sufficient to cover the van's floor surface, e.g. from about five feet to about eight feet wide and from about five feet to about twelve feet long. The composite has excellent insulating qualities due to the dead air space in the plastic core and the foam underlay. Additionally, the composite has good acoustic qualities in reducing road noise from outside the van and within the van. More importantly, the subflooring composite is easy to cut to a desired shape and install. Its lightweight makes it easy to handle by a single worker.

Subflooring composite 20 illustrated in FIG. 3 has an optional fibrous overlay 21 adhered to the top surface of plastic core 11. The overlay is preferably a felted fibrous sheet adhesively secured to the plastic core. Various woven and non-woven sheets and mattings of fibrous materials can as well be used. The fibrous overlay adds additional cushioning, insulation and acoustic qualities to the subflooring composite. An overlay thickness of from about 0.3 inches to about 0.6 inches provides an optimum balance of performance and cost.

Vans typically have a generally rectangular-shaped interiors, though the exact dimensions and shapes will vary widely depending on the vehicle make and model. However, the physical characteristics of the composite allow it to be cut, preferably die-cut, according to need. As shown in FIG. 4, the subflooring composite 20 has wheel well cut-outs 25, step cut-outs 26 and seat cut-outs 27 as well as contoured edges. As can be well imagined, other shapes are needed depending on the van being equipped. Such shapes are readily produced from the aforedescribed subflooring composite.

In accord with this invention, the subflooring composite is produced by applying an adhesive to one side of the plastic core and/or the foam underlay and laminating them together. If needed, the fibrous overlay is next adhesively adhered to the other side of the plastic core. The composite is then cut to exact specifications, which preferably gives a one piece unit which can be laid directly onto the interior floor surface of a van. Because of the rigidity of the plastic core and the vertical walls of the van, the subflooring will remain in place. For further assurance of non-slippage during use, the subflooring composite can be adhesively adhered to the metal floor surface of the van. The installed subflooring can receive a carpet. Any fixture such as swivel chairs, cabinets, etc. are bolted through the subflooring composite and, if needed, into the van's metal floor.

While the invention has been described with particular reference to the drawings, it should be understood various modifications are possible. All obvious modifications and changes are within the scope of the following claims.

What is claimed is:

1. A lightweight subflooring composite for use in a van, said composite comprising:
   (a) a core of a plastic material having a thin planar bottom surface layer and a thin planar top surface layer with a series of substantially equi-spaced and generally vertically extending support walls connecting the bottom surface and top surface layers in a manner to form a unitary core structure with substantial dead air space, said plastic material further characterized in having a thickness of from about 0.1 inches to about 0.4 inches, sufficient structural strength to withstand vertical and lateral forces as normally encountered by a floor in the van without crushing and without wrinkling, and good insulation properties;
   (b) a foam underlay adhered to the plastic core, said foam underlay capable of being adhesively attached to the floor of the van; and
   (c) a fibrous overlay adhered to the plastic core for added comfort, acoustic and insulation properties.

2. The subflooring composite of claim 1 wherein the plastic core is further characterized in having from three to ten support walls per linear inch.

3. The subflooring of claim 2 wherein the support walls extend from the bottom surface layer at an angle of from about thirty-five degrees to about ninety degrees from the horizontal.

4. The subflooring composite of claim 3 wherein the plastic core has a vertical structural strength of at least about 80 pounds per square inch.

5. The subflooring composite of claim 4 wherein the plastic core has a thickness ranging from about 0.2 inches to about 0.3 inches.

6. The subflooring composite of claim 1 wherein the foam underlay is a polyurethane foam.

7. The subflooring composite of claim 6 wherein the foam underlay has a thickness of from about 0.1 inches to about 0.4 inches and a density of from about two pounds per cubic foot to about four pounds per cubic foot.

8. The subflooring composite of claim 1 wherein the fibrous overlay is a felted fibrous sheet.

9. The subflooring composite of claim 8 wherein the felted fibrous sheet has a thickness of from about 0.3 inches to about 0.6 inches.

10. A van subflooring composite precut to fit onto a van's rear interior floor area to cover the floor and abut against vertical interior walls of the van so as to prevent lateral movement, said subflooring comprising a composite of:
    (a) a core of a plastic material having a thin planar bottom surface layer and a thin planar top surface layer with a series of substantially equi-spaced and generally vertically extending support walls connecting the bottom surface and top surface layers in a manner to form a unitary core structure with substantial dead air space, said plastic material further characterized in having a thickness of from about 0.1 inches to about 0.4 inches, sufficient structural strength to withstand vertical and lateral forces as normally encountered by a floor in the van without crushing and without wrinkling, and good insulation properties;
    (b) a foam underlay adhered to the plastic core, said foam underlay capable of being adhesively attached to the floor of the van; and
    (c) a fibrous overlay adhered to the plastic core for added comfort, acoustic and insulation properties.

11. The van subflooring composite of claim 10, wherein the plastic core is further characterized in having from three to ten support walls per linear inch.

12. The van subflooring composite of claim 11 wherein the support walls extend from the bottom surface layer at an angle of from about thirty-five degrees to about ninety degrees from the horizontal.

13. The van subflooring composite of claim 12 wherein the plastic core has a vertical structural strength of at least about 80 pounds per square inch.

14. The van subflooring composite of claim 13 wherein the plastic core has a thickness ranging from about 0.2 inches to about 0.3 inches.

15. The van subflooring composite of claim 10 wherein the foam underlay has a thickness of from about 0.1 inches to about 0.4 inches and a density of from about two pounds per cubic foot to about four pounds per cubic foot.

16. The van subflooring composite of claim 10 wherein the fibrous overlay is a felted fibrous sheet.

17. The van subflooring composite of claim 16 wherein the felted fibrous sheet has a thickness of from about 0.3 inches to about 0.6 inches.

18. The van subflooring composite of claim 10 wherein said composite has a generally rectangular-shape with cut-out portions at its edges and contoured edges to accommodate an irregular shape of the van's interior area.

19. A subflooring for vans, said subflooring shaped so as to be generally rectangular with a width of from about five feet to about eight feet and a length of from about five feet to about twelve feet with cut-out portions at its edges and contoured edges so to substantially cover the van's rear interior floor area and abut against vertical interior walls of the van to prevent lateral movement, said subflooring comprising a composite of:
(a) a core of a plastic material having a thin planar bottom surface layer and a thin planar top surface layer with a series of substantially equi-spaced and generally vertically extending support walls connecting the bottom surface and top surface layers in a manner to form a unitary core structure with substantial dead air space, said plastic material further characterized in having a thickness of from about 0.1 inches to about 0.4 inches, sufficient structural strength to withstand vertical and lateral forces as normally encountered by a floor in the van without crushing and without wrinkling, and good insulation properties; and
(b) a foam underlay adhered to the plastic core, said foam underlay capable of being adhesively attached to the floor of the van.

20. The subflooring of claim 19 wherein the plastic core is further characterized in having from three to ten support walls per linear inch.

21. The subflooring of claim 20 wherein the support walls extend from the bottom surface layer at an angle of from about thirty-five degrees to about ninety degrees from the horizontal.

22. The subflooring of claim 21 wherein the plastic core has a vertical structural strength of at least about 80 pounds per square inch.

23. The subflooring of claim 22 wherein the plastic core has a thickness ranging from about 0.2 inches to about 0.3 inches.

24. The subflooring of claim 19 wherein the foam underlay has a thickness of from about 0.1 inches to about 0.4 inches and a density of from about two pounds per cubic foot to about four pounds per cubic foot.

25. The subflooring of claim 24 wherein the foam underlay is an open-cell polyurethane foam.

26. The subflooring of claim 19 wherein the subflooring is a one piece unit.

* * * * *